April 8, 1924.
H. H. RAINS
STEAM JOINT CONSTRUCTION
Filed March 28, 1921
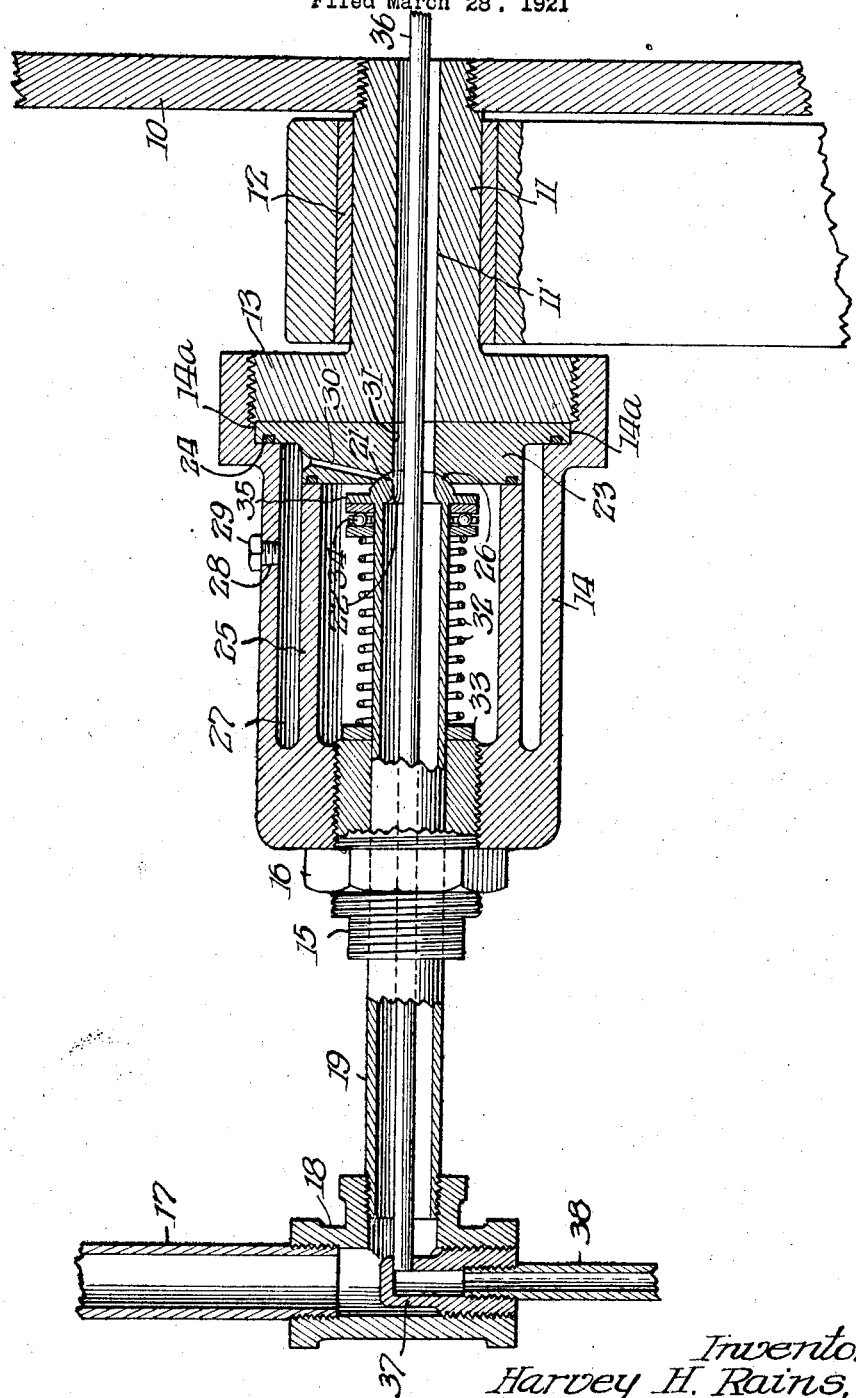
Inventor:
Harvey H. Rains,
By Samuel N. Pond,
atty.

Patented Apr. 8, 1924.

1,489,277

UNITED STATES PATENT OFFICE.

HARVEY H. RAINS, OF CHICAGO, ILLINOIS.

STEAM-JOINT CONSTRUCTION.

Application filed March 28, 1921. Serial No. 456,062.

*To all whom it may concern:*

Be it known that I, HARVEY H. RAINS, a citizen of the United States, residing at Chicago, in the county of Cook and State of Illinois, have invented certain new and useful Improvements in Steam-Joint Constructions, of which the following is a specification.

This invention relates to steam joint constructions, and in its principal intended application is designed as a steam joint for the drying drums of paper-making machines. The steam for heating such drums is commonly introduced through a hollow bearing member at one end of the drum from a stationary supply pipe, and this, of course, necessitates the provision of a steam tight joint between the relative stationary and rotating parts. The main object of the present invention is to provide an improved steam tight joint wherein friction is reduced to a minimum and leakage of steam at the joint is avoided. Another object is to provide a joint construction characterized by simplicity of structure and minimum requirements in the way of space occupied. A further object is to provide a construction of the ball joint type capable of being readily disassembled, when required, easily lubricated, involving a minimum of wear and wherein the thrust between the joint ball and its seating member may be easily adjusted to compensate for wear and prevent leakage.

Other objects and attendant advantages of the invention will be apparent to persons familiar with devices of this character from the following detailed description, taken in connection with the accompanying drawing, wherein the single figure shows my improved steam joint construction in longitudinal axial section as applied to a rotary drying drum of a paper-making machine.

Referring to the drawing, which is a vertical sectional view, 10 designates an end wall of a drying drum, into which is entered a hollow metal bearing member or gudgeon 11, suitably journaled in a bearing 12. The gudgeon 11 has on its outer end an externally threaded head 13 which screws into and fills one end of a generally cylindrical housing 14. In the opposite end of the housing 14 is entered a hollow adjusting screw 15, the purpose of which will later appear, and 16 designates a lock nut on the adjusting screw 15 and bearing against the outer end wall of the housing 14.

17 designates a steam supply pipe extending opposite one end of the drum 10, and 18 is a T-coupling on the lower end of the pipe 17, the stem of said coupling being connected to a horizontal steam pipe section 19 which extends through the adjusting nut 15 and into the housing 14, being coaxial with the latter. On the inner end of the steam pipe section 19 is formed or secured a ball-shaped bearing member 21 the latter having an axial bore 22 which communicates freely with the interior of the steam pipe section 19. Clamped within the larger end of the housing 14 by means of the gudgeon and rotating with the latter and is formed with an outer portion snugly fitting the enlarged end portion 14ª and bearing against the annular shoulder 24 thereof, and an inner portion of reduced diameter which bears against the free end of an inner cylindrical shell 25 that is formed in the housing 14. This disc 23, on its inner face, has a concave substantially hemispherical seat 26 that is ground to a nice fit with the convex substantially hemispherical face of the ball joint member 21. Between the outer cylindrical wall of the housing 14 and the inner shell 25 is an annular chamber 27 which is designed to be filled with oil through a filling hole 28 normally closed by a plug 29. The reduced inner portion of the seating plate or disc 23 constitutes a part of the inner wall of the oil chamber 27, and through this reduced portion of the seating plate 23 is formed a radial oil duct 30 by which the oil is led to the engaging surfaces of the ball joint. The seating plate 23 is formed with an axial bore 31 that registers with the bore 22 and also with the axial bore 11′ of the gudgeon 11, thereby providing a free continuous steam passage from the supply pipe 17 to the interior of the drum.

The ball joint member 21 is urged to a tight fit on its seat 26 by means of a compression spring 32 which at its outer end abuts against a washer 33 in turn abutting against the inner end of the adjusting screw 15 and at its opposite end abuts against a ball thrust bearing 34, that in turn abuts against a flange 35 on the ball joint member 21. Manifestly by loosening the lock nut 16 and applying a wrench to the outer end of the adjusting screw 15, the tension of the spring 32 may be increased or lessened, as desired, so as to secure a steam tight joint between the ball joint member 21 and its seat. In the construction shown, the seating plate 26 rotates with the drying drum on the ball joint member 21 which is non-rotatable with the pipe 19, and the lubricant supplied from the oil chamber 27 through the duct 30 both lubricates the joint to reduce wear and renders the joint more perfectly steam tight.

36 designates a drain pipe for water of condensation that extends co-axially through the entire assembly and at its outer end connects into a drain coupling 37 located within the T-coupling 18 and itself connected to a drain passage pipe 38.

It is believed that the foregoing description will render clear to those skilled in the art the novel structural features and the practical advantages of the present invention. Should the joint show a steam leakage this is quickly cured by simply turning up the adjusting nut 15 by which increased pressure is applied to the ball joint member 21. Oil can be supplied as often as required by simply removing the plug 29 and re-filling the oil chamber 27.

When it is necessary to get at the interior parts, the housing 14 can be simply unscrewed from the gudgeon head 13 and slipped backwardly along the pipe 19, the seating disc 23 having been withdrawn. The entire device is self-contained and occupies comparatively little space. Again, the ball joint obviates the necessity of having the supply pipe section 19 in exact axial alinement with the gudgeon of the drum.

It is manifest that the device herein illustrated and described in detail may be variously modified in respect of details of structure and arrangement without altering its substantial character or sacrificing any of the advantages inherent therein. Hence I reserve all such variations and modifications as fall within the spirit and purview of the appended claims.

I claim:

1. In a steam joint construction, the combination with a steam inlet pipe, of a journaled gudgeon having a steam inlet duct in line with said pipe, a housing separably connected at one end to one end of said gudgeon and rotating with the latter, said housing containing an oil chamber, an axially bored ball joint member on the inner end of said steam inlet pipe within said housing, an axially bored member mounted within and rotating with said housing and formed with a concave seat engaged with said ball joint member and with an oil conduit leading from said oil chamber to said seat, and a compression spring maintaining a snug fit of said ball joint member and said seat.

2. In a steam joint construction, the combination with a steam inlet pipe, of a journaled gudgeon having a steam inlet duct in line with said pipe, a housing separably connected at one end to one end of said gudgeon and rotating with the latter and at its other end rotatably and slidably mounted on said pipe, said housing containing an oil chamber, an axially bored ball joint member on the inner end of said steam inlet pipe within said housing, an axially bored member fixedly mounted within and rotating with said housing and formed with a concave seat engaged with said ball joint member and with an oil conduit leading from said oil chamber to said seat, and a compression spring pressing said ball joint member and seat into steam-tight engagement with each other.

3. In a steam joint construction, the combination with a steam inlet pipe, of a journaled gudgeon having a steam inlet duct in line with said pipe, a housing removably mounted at one end on one end of said gudgeon and rotating with the latter and at its other end rotatably and slidably mounted on said pipe, said housing containing an annular oil chamber open at one end, an axially bored ball joint member on the inner end of said steam inlet pipe within said housing, an axially bored seating disc within said housing closing the open end of said annular oil chamber and formed with a central concave seat engaged with said ball joint member and with a radial oil duct leading from said oil chamber to said seat, and an oil compression spring encircling said steam inlet pipe and pressing said ball joint member against said seat.

4. In a steam joint construction, the combination with a steam inlet pipe, and a journaled gudgeon having a steam inlet duct in line with said pipe, of a housing carried by and rotating with said gudgeon and containing an annular oil chamber, a hollow adjusting screw in the outer end wall of said housing rotatably mounted on said pipe, an axially bored ball joint member on the inner end of said pipe within said housing, an axially bored seating disc immovably held within said housing having a central concave seat engaged with said ball joint member and an oil duct leading from said oil chamber to said seat, and a coil compression spring encircling said pipe, said spring abutting at its outer end against said adjusting screw and at its inner end against said ball joint member.

5. In a steam joint construction, the combination with a steam inlet pipe, and a journaled gudgeon having a steam inlet duct in line with said pipe and a threaded head on its outer end, of a housing having one end internally threaded for engagement with said gudgeon head and at its other end journaled on said pipe, said housing having an annular oil chamber, an axially bored ball joint member on the inner end of said pipe within said housing, an axially bored seating disc clamped within said housing by said gudgeon head and closing one end of said oil chamber, said seating disc having a central concave seat engaged with said ball joint member and an oil duct leading from said oil chamber to said seat, and a coil compression spring encircling said pipe and pressing said ball joint member against said seat.

HARVEY H. RAINS.